United States Patent
Hanayama et al.

(10) Patent No.: US 11,130,488 B2
(45) Date of Patent: Sep. 28, 2021

(54) VEHICLE CONTROL DEVICE AND VEHICLE CONTROL METHOD

(71) Applicant: HONDA MOTOR CO., LTD., Tokyo (JP)

(72) Inventors: Ken Hanayama, Wako (JP); Takuyuki Mukai, Wako (JP); Jun Tanaka, Wako (JP); Jun Ibuka, Wako (JP); Hiroaki Horii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 16/462,037

(22) PCT Filed: Nov. 21, 2016

(86) PCT No.: PCT/JP2016/084399
§ 371 (c)(1),
(2) Date: May 17, 2019

(87) PCT Pub. No.: WO2018/092298
PCT Pub. Date: May 24, 2018

(65) Prior Publication Data
US 2019/0329765 A1 Oct. 31, 2019

(51) Int. Cl.
*B60W 30/09* (2012.01)
*B60T 7/12* (2006.01)
(Continued)

(52) U.S. Cl.
CPC .............. *B60W 30/09* (2013.01); *B60T 7/12* (2013.01); *G08G 1/166* (2013.01);
(Continued)

(58) Field of Classification Search
CPC .. B60W 30/09; B60W 2554/00; B60W 10/04; B60W 10/18; B60W 30/18154;
(Continued)

(56) References Cited

U.S. PATENT DOCUMENTS 8,571,743 B1 * 10/2013 Cullinane ................ G05D 1/00
701/23
2005/0128063 A1 * 6/2005 Isaji ....................... B60W 40/10
340/439
(Continued)

FOREIGN PATENT DOCUMENTS

JP   2011-240852 A   12/2011
JP   2014-099078 A    5/2014
(Continued)

OTHER PUBLICATIONS

PCT/ISA/210 from International Application PCT/JP2016/084399 with the English translation thereof.
(Continued)

*Primary Examiner* — Michael V Kerrigan
(74) *Attorney, Agent, or Firm* — Carrier Blackman & Associates, P.C.; Joseph P. Carrier; Jeffrey T. Gedeon (57) ABSTRACT

This vehicle control device comprises an autonomous driving control unit which automatically controls the stopping of a vehicle. If it is determined by a crossing determination unit that there is no crossing, the autonomous driving control unit controls the stopping of the vehicle so that the vehicle is stopped at a standard target stop position corresponding to a stop line on the basis of the positional information of the stop line, whereas if it is determined by the crossing determination unit that there is a crossing, the autonomous driving control unit controls the stopping of the vehicle so that the vehicle is stopped at a position before the standard target stop position on the basis of the positional information of the stop line.

13 Claims, 7 Drawing Sheets

(51) Int. Cl.
*G08G 1/16* (2006.01)
*B60W 10/04* (2006.01)
*B60W 10/18* (2012.01)

(52) U.S. Cl.
CPC .......... *B60T 2210/32* (2013.01); *B60W 10/04* (2013.01); *B60W 10/18* (2013.01); *B60W 2554/00* (2020.02)

(58) Field of Classification Search
CPC ......... B60W 10/00; B60W 10/20; B60T 7/12; B60T 2210/32; G08G 1/166
See application file for complete search history.

(56) References Cited

U.S. PATENT DOCUMENTS

| | | | | |
|---|---|---|---|---|
| 2008/0162027 | A1* | 7/2008 | Murphy | G05D 1/0246 701/117 |
| 2017/0018187 | A1* | 1/2017 | Kim | G08G 1/166 |
| 2017/0057514 | A1* | 3/2017 | Toyoda | B60W 30/18154 |
| 2017/0232964 | A1* | 8/2017 | Moritani | B60T 7/22 701/70 |
| 2018/0218601 | A1* | 8/2018 | Aoki | G08G 1/096725 |
| 2018/0319325 | A1* | 11/2018 | Tatara | G08G 1/162 |
| 2019/0023239 | A1* | 1/2019 | Fujita | B60W 30/09 |
| 2019/0031198 | A1* | 1/2019 | Aoki | B60W 30/0956 |
| 2019/0270405 | A1* | 9/2019 | Fukumoto | B60Q 1/50 |

FOREIGN PATENT DOCUMENTS

| | | |
|---|---|---|
| JP | 2016-122362 A | 7/2016 |
| WO | 2016/052507 A1 | 4/2016 |

OTHER PUBLICATIONS

Office Action dated Sep. 8, 2020 issued over the corresponding Japanese national phase Patent Application No. 2018-550991 with the English translation thereof.

* cited by examiner

FIG. 5

VEHICLE CONTROL DEVICE AND VEHICLE CONTROL METHOD

TECHNICAL FIELD

The present invention relates to a vehicle control device including an automated driving control unit that automatically performs stop control of a host vehicle, and a vehicle control method.

BACKGROUND ART

Japanese Laid-Open Patent Publication No. 2016-122362 discloses a traffic assistance device. In the traffic assistance device, an ECU of a host vehicle detects a stop signal (red signal), and if a stop line corresponding to the stop signal can be detected, the traffic assistance device performs entry suppressing assistance on the basis of the stop line. Specifically, for example, in a situation where the stop line is provided before a pedestrian crossing, if it is determined that the host vehicle may be unable to stop at the stop line, the ECU of the host vehicle warns, and if deceleration speed of the host vehicle after the warning is still insufficient, the ECU of the host vehicle starts an automatic brake.

SUMMARY OF INVENTION

Incidentally, in a case where the host vehicle is stopped by stop control at a position just before the stop line that is before a crossing area such as a pedestrian crossing and a bicycle crossing zone, a traffic participant such as a pedestrian and a cyclist who passes the pedestrian crossing may feel uncomfortable or pressure since the host vehicle is relatively close to the crossing area. Moreover, if the host vehicle, which stops just before the stop line, automatically starts to travel, the host vehicle reaches the crossing area in a relatively short time. Thus, a vehicle occupant may want to feel safer by extending the time to prepare for an unexpected event (for example, the traffic participant enters the crossing area when the host vehicle automatically starts to travel). It has been desired to meet the vehicle occupant's request.

The present invention has been made in view of the above problem, and an object is to provide a vehicle control device and a vehicle control method in which, when a host vehicle stops on the basis of a stop line before a crossing area, a traffic participant who is passing the crossing area can feel safe and a vehicle occupant can feel safer when the host vehicle automatically starts to travel.

A vehicle control device according to the present invention includes: an automated driving control unit configured to automatically perform stop control of a host vehicle; a crossing area determination unit configured to determine whether a crossing area where a traffic participant crosses exists in a travel direction of the host vehicle; and a stop line position acquisition unit configured to acquire positional information of a stop line, wherein: if the crossing area determination unit determines that the crossing area does not exist, the automated driving control unit is configured to perform the stop control of the host vehicle so that the host vehicle stops at a reference target stop position corresponding to the stop line on a basis of the positional information of the stop line; and if the crossing area determination unit determines that the crossing area exists, the automated driving control unit is configured to perform the stop control of the host vehicle so that the host vehicle stops before the reference target stop position on a basis of the positional information of the stop line.

In this configuration, if the crossing area exists in the travel direction of the host vehicle, the host vehicle stops before the reference target stop position. Thus, a space between the crossing area and the host vehicle can be kept wide relatively. Therefore, the traffic participant who is passing the crossing area can feel safe. Moreover, the time after the host vehicle starts to travel automatically and before the host vehicle reaches the crossing area can be made relatively long. Thus, the time to prepare for an unexpected event can be extended. Therefore, a vehicle occupant can feel safer.

The above vehicle control device may further include a traffic participant recognition unit configured to recognize the traffic participant around the crossing area wherein: if the traffic participant recognition unit does not recognize the traffic participant while the host vehicle travels, the automated driving control unit may be configured to perform the stop control of the host vehicle so that the host vehicle stops at a first target stop position that is before the reference target stop position; and if the traffic participant recognition unit recognizes the traffic participant while the host vehicle travels, the automated driving control unit may be configured to perform the stop control of the host vehicle so that the host vehicle stops at a second target stop position that is before the first target stop position.

In this configuration, if the traffic participant is not recognized, the host vehicle stops at the first target stop position that is relatively close to the stop line. Thus, a driver feels less uncomfortable, and the traffic participant who has come near the crossing area after the host vehicle stops can also feel safe. Moreover, if the traffic participant is recognized, the host vehicle stops at the second target stop position that is relatively far from the stop line. Thus, the traffic participant can feel safer.

In the above vehicle control device, the automated driving control unit may be configured to correct the second target stop position so that as the traffic participant recognition unit recognizes more traffic participants, a separation distance from the stop line to the second target stop position becomes longer.

Incidentally, as the number of the traffic participants is larger, the traffic participant tends to go outside the crossing area. However, in this configuration, as the number of the traffic participants is larger, the separation distance from the stop line to the second target stop position is longer. Thus, the traffic participant who goes outside the crossing area can also feel safe.

In the above vehicle control device, if the automated driving control unit has received a travel start request signal of the host vehicle after the stop control of the host vehicle ends, the automated driving control unit may be configured to automatically perform travel start control of the host vehicle.

In this configuration, the host vehicle can automatically start to travel on a basis of the travel start request signal.

In the above vehicle control device, if the automated driving control unit has received the travel start request signal, the automated driving control unit may be configured to perform the travel start control of the host vehicle so that a travel start required time from when the automated driving control unit has received the travel start request signal to when the host vehicle starts to travel becomes longer in a case where the crossing area determination unit determines that the crossing area exists, than in a case where the crossing area determination unit determines that the crossing area does not exist.

In this configuration, in a case where there is a possibility that the traffic participant who has come near the crossing area after the host vehicle is permitted to travel (for example, after a traffic signal permits the host vehicle to travel) enters the crossing area, a timing for starting the host vehicle traveling can be delayed. Therefore, the time to prepare for the unexpected event can be extended.

In the above vehicle control device, the automated driving control unit may be configured to perform the travel start control of the host vehicle so that the travel start required time becomes longer in a case where the traffic participant recognition unit recognizes the traffic participant around the crossing area, than in a case where the traffic participant recognition unit does not recognize the traffic participant around the crossing area.

In this configuration, in a case where there is a possibility that the traffic participant who is around the crossing area after the host vehicle is permitted to travel enters the crossing area, the timing for starting the host vehicle traveling can be delayed. Therefore, the time to prepare for the unexpected event can be extended.

In the above vehicle control device, the automated driving control unit may be configured to correct the travel start required time so that as the traffic participant recognition unit recognizes more traffic participants, the travel start required time becomes longer.

In this configuration, as the traffic participant who is around the crossing area after the host vehicle is permitted to travel is more likely to enter the crossing area, the timing for starting the host vehicle traveling can be delayed more. Therefore, the time to prepare for the unexpected event can be extended more.

In the above vehicle control device, if the automated driving control unit has received the travel start request signal, the automated driving control unit may be configured to perform the travel start control of the host vehicle so that travel start acceleration of the host vehicle at a travel start is smaller in the case where the crossing area determination unit determines that the crossing area exists, than in the case where the crossing area determination unit determines that the crossing area does not exist.

In this configuration, even if the traffic participant has come near the crossing area after the host vehicle is permitted to travel, the traffic participant can feel safe and the time to prepare for the unexpected event can be extended more.

In the above vehicle control device, the automated driving control unit may be configured to perform the travel start control of the host vehicle so that the travel start acceleration is smaller in a case where the traffic participant recognition unit recognizes the traffic participant around the crossing area, than in a case where the traffic participant recognition unit does not recognize the traffic participant around the crossing area.

In this configuration, in the case where the traffic participant exists around the crossing area in the travel start of the host vehicle, the traffic participant can feel safe and the time to prepare for the unexpected event can be extended more.

In the above vehicle control device, the automated driving control unit may be configured to correct the travel start acceleration so that as the traffic participant recognition unit recognizes more traffic participants, the travel start acceleration is smaller.

This configuration effectively enables the traffic participant around the crossing area to feel safe in the travel start of the host vehicle, and as the number of the traffic participants is larger, the time to prepare for the unexpected event can be extended.

A vehicle control method according to the present invention includes: a crossing area determination step of determining whether a crossing area where a traffic participant crosses exists in a travel direction of a host vehicle; and a stop control step of automatically performing stop control of the host vehicle, wherein in the stop control step, if it is determined that the crossing area does not exist in the crossing area determination step, the stop control of the host vehicle is performed so that the host vehicle stops at a reference target stop position corresponding to a stop line on a basis of positional information of the stop line, and if it is determined that the crossing area exists in the crossing area determination step, the stop control of the host vehicle is performed so that the host vehicle stops before the reference target stop position on a basis of the positional information of the stop line.

The above vehicle control method may further include a traffic participant recognition step of recognizing the traffic participant around the crossing area, wherein in the stop control step, if the traffic participant is not recognized in the traffic participant recognition step while the host vehicle travels, the stop control of the host vehicle may be performed so that the host vehicle stops at a first target stop position before the reference target stop position, and if the traffic participant is recognized in the traffic participant recognition step while the host vehicle travels, the stop control of the host vehicle may be performed so that the host vehicle stops at a second target stop position before the first target stop position.

In the above vehicle control method, in the stop control step, the second target stop position may be corrected so that as more traffic participants are recognized in the traffic participant recognition step, a separation distance from the stop line to the second target stop position becomes longer.

DESCRIPTION OF EMBODIMENTS

An example of a preferred embodiment of a vehicle control device and a vehicle control method according to the present invention is hereinafter described with reference to the attached drawings.

Figure 1:
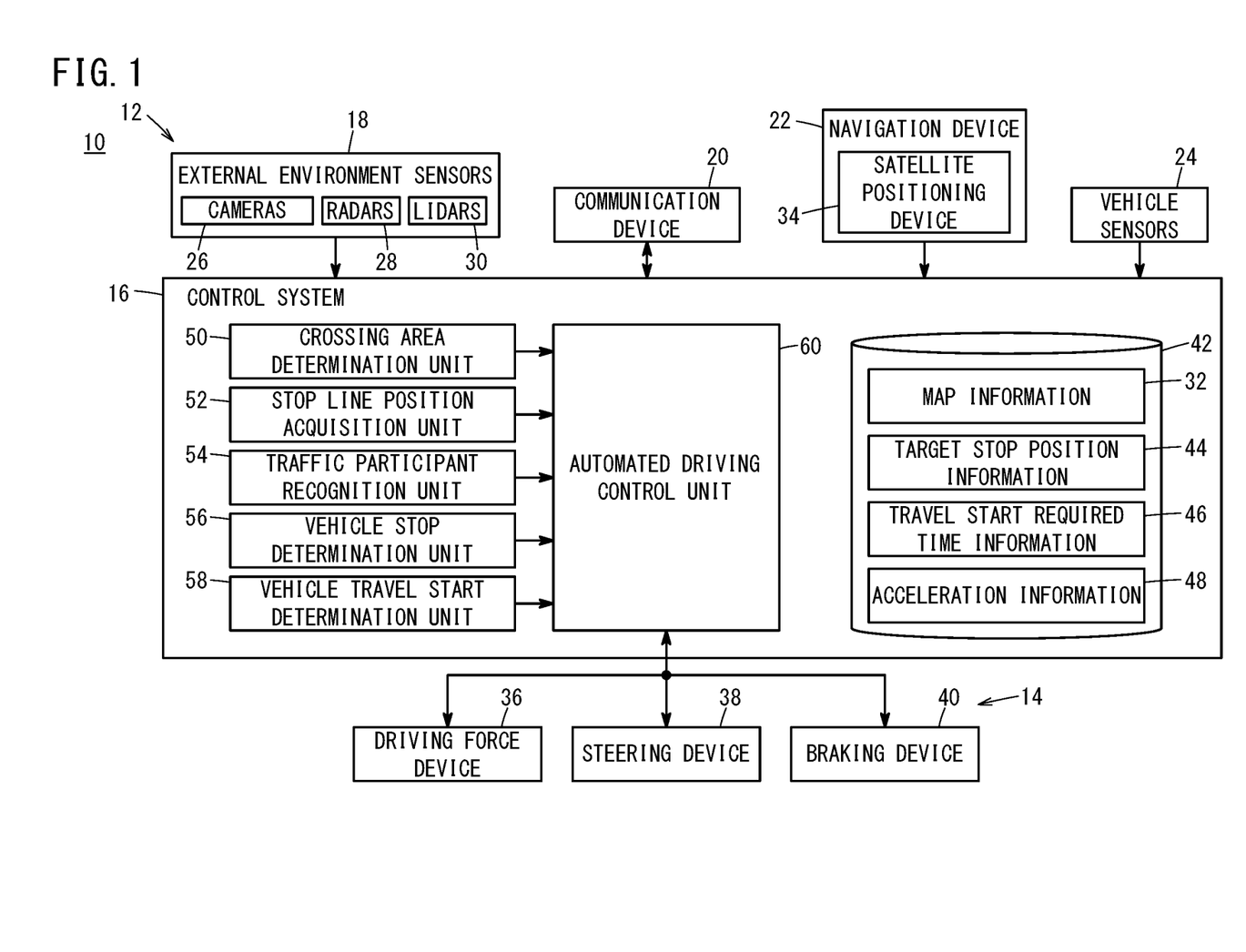
FIG. 1 is a block diagram that illustrates a configuration of a vehicle control device according to one embodiment of the present invention.

As illustrated in FIG. 1, a vehicle control device 10 according to the present embodiment is incorporated into a host vehicle 100 (see FIG. 3), and configured so that the host vehicle 100 can be switched between a manual driving mode (non-automated driving mode) and an automated driving mode by a mode changing switch or the like that is not shown. Specifically, this vehicle control device 10 is configured so as to perform a driving operation of the host vehicle 100 partially automatically in a state of the automated driving mode. However, the vehicle control device 10 may perform the driving operation of the host vehicle 100 fully automatically in the state of the automated driving mode. Alternatively, the vehicle control device 10 may perform fully automated driving in which a vehicle occupant does not perform the driving operation at all (mode switching is not performed).

The vehicle control device 10 basically includes an input system device group 12, an output system device group 14, and a control system 16. Each of devices that form the input system device group 12 and the output system device group 14 is connected to the control system 16 through a communication line.

The input system device group 12 includes external environment sensors 18, a communication device 20, a navigation device 22, and vehicle sensors 24. The external environment sensors 18 acquire information expressing an external environment state of the host vehicle 100 (hereinafter, external environment information), and output this external environment information to the control system 16. The external environment sensors 18 specifically include a plurality of cameras 26, a plurality of radars 28, and a plurality of LIDARs 30 (Light Detection and Ranging, Laser Imaging Detection and Ranging).

The communication device 20 can communicate with an external device including a road-side machine, another vehicle, and a server. For example, the communication device 20 transmits and receives information regarding traffic equipment, information regarding the other vehicle, probe information, or the latest map information 32. This map information 32 is stored in a predetermined memory area of a storage device 42 to be described below or the navigation device 22.

The navigation device 22 includes a satellite positioning device 34 that can detect the current position of the host vehicle 100, and a user interface (for example, touch panel type display, speaker, and microphone). The navigation device 22 calculates a route to a designated destination on the basis of the current position of the host vehicle 100 or a position designated by a user, and outputs the calculated route to the control system 16.

The vehicle sensors 24 include a speed sensor, an acceleration sensor, a lateral acceleration sensor, a yaw rate sensor, an azimuth sensor, an inclination sensor, or the like, and output a detection signal from each sensor to the control system 16.

The output system device group 14 includes a driving force device 36, a steering device 38, and a braking device 40. The driving force device 36 includes a driving force ECU (Electronic Control Unit) and a driving source including an engine/traction motor. The driving force device 36 generates travel driving force (torque) of the host vehicle 100 in accordance with a vehicle control value that is input from the control system 16, and transmits the travel driving force to wheels directly or through a transmission.

The steering device 38 includes an EPS (electric power steering system) ECU and an EPS device. The steering device 38 changes the direction of the wheels (steering wheels) in accordance with the vehicle control value that is input from the control system 16.

For example, the braking device 40 is an electric servo brake that is used in combination with a hydraulic brake, and includes a brake ECU and a brake actuator. The braking device 40 brakes the wheels in accordance with the vehicle control value that is input from the control system 16.

The control system 16 is configured by one or a plurality of ECUs, and includes the storage device 42 and various function achievement units. Note that, in this embodiment, the function achievement unit is a software function unit that achieves a function when a CPU (central processing unit) executes programs stored in the storage device 42. However, the function achievement unit to achieve the function may be a hardware function unit including an integrated circuit such as an FPGA (Field-Programmable Gate Array).

The storage device 42 includes a random access memory (hereinafter, referred to as "RAM"), for example. A volatile memory such as a register and a non-volatile memory such as a flash memory can be used as the RAM. In addition, the storage device 42 may include a read only memory (hereinafter, referred to as "ROM") in addition to the RAM.

The storage device 42 stores in advance, the aforementioned map information 32, target stop position information 44, travel start required time information 46, and acceleration information 48.

The target stop position information 44 is information regarding a target stop position with respect to a stop line 106 (see FIG. 3, etc.), and includes a reference target stop position P1, a first target stop position P2, and a second target stop position P3. The reference target stop position P1 is set before the stop line 106, the first target stop position P2 is set before the reference target stop position P1, and the second target stop position P3 is set before the first target stop position P2. That is to say, a separation distance from the stop line 106 to the first target stop position P2 is longer than a separation distance from the stop line 106 to the reference target stop position P1, and shorter than a separation distance from the stop line 106 to the second target stop position P3.

The travel start required time information 46 is information regarding a required time from when an automated driving control unit 60 to be described below receives a travel start request signal to when the host vehicle 100 actually starts to travel, and includes a reference travel start required time $\Delta T$, a first travel start required time $\Delta T1$, and a second travel start required time $\Delta T2$. The first travel start required time $\Delta T1$ is longer than the reference travel start required time $\Delta T$, and shorter than the second travel start required time $\Delta T2$.

The acceleration information 48 is information regarding acceleration when the host vehicle 100 starts to travel, and includes reference travel start acceleration G, first travel start acceleration G1, and second travel start acceleration G2. The first travel start acceleration G1 is smaller than the reference travel start acceleration G, and larger than the second travel start acceleration G2.

The control system 16 includes, in addition to the above storage device 42, a crossing area determination unit 50, a stop line position acquisition unit 52, a traffic participant recognition unit 54, a vehicle stop determination unit 56, a vehicle travel start determination unit 58, and the automated driving control unit 60.

Figure 4:
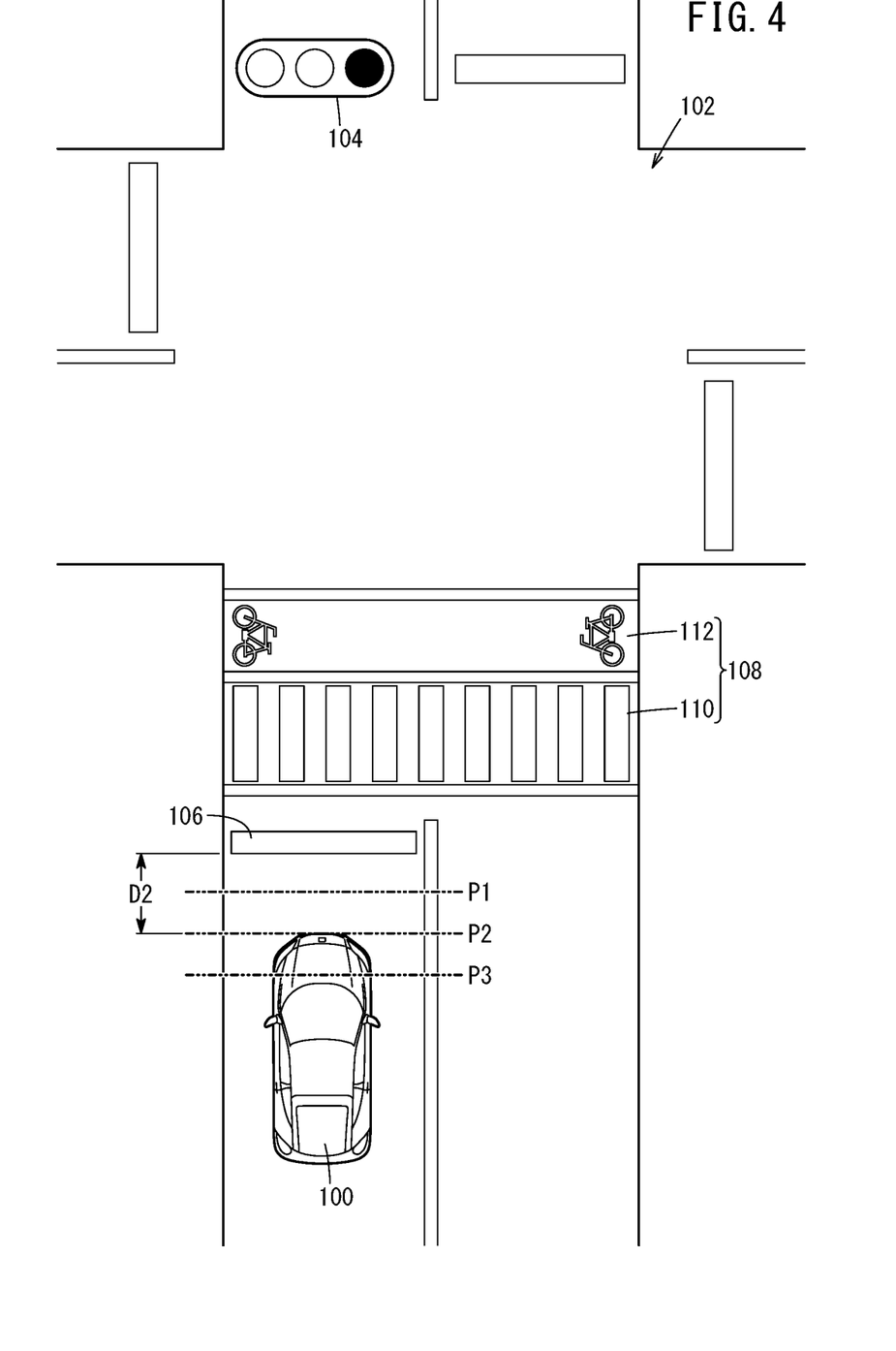
FIG. 4 is an explanatory diagram that schematically illustrates a state where the host vehicle stops at a first target stop position.
Figure 5:
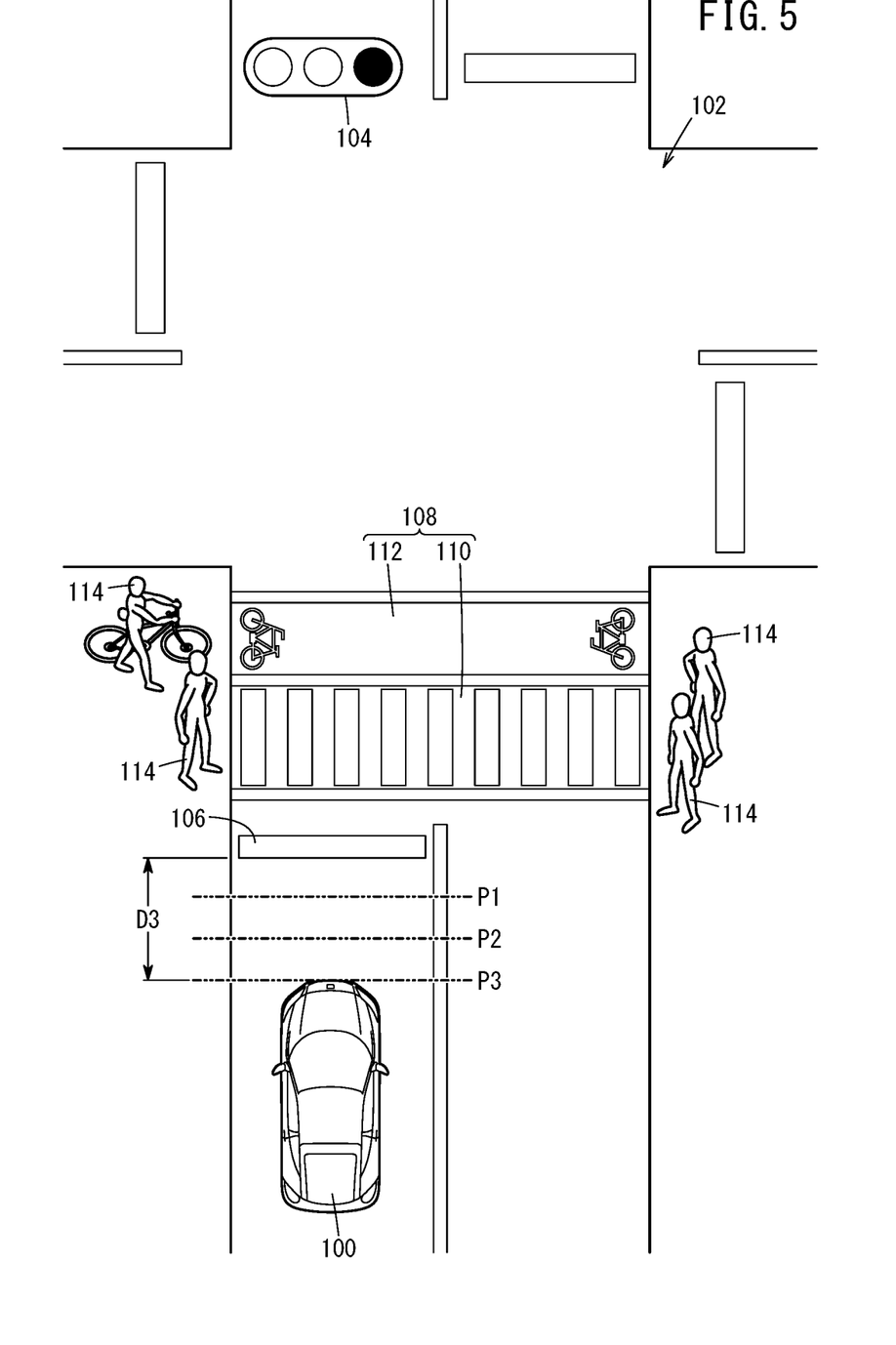
FIG. 5 is an explanatory diagram that schematically illustrates a state where the host vehicle stops at a second target stop position.

The crossing area determination unit 50 determines whether a crossing area 108 where a traffic participant 114 (see FIG. 5) passes (crosses) exists in a travel direction of the host vehicle 100. Here, the traffic participant 114 includes a pedestrian, a cyclist, or the like. In FIG. 4 and FIG. 5, the crossing area 108 includes a pedestrian crossing 110 and a bicycle crossing zone 112. However, the crossing area 108 may include only one of the pedestrian crossing 110 and the bicycle crossing zone 112.

The stop line position acquisition unit 52 acquires positional information of the stop line 106 before the crossing area 108 on the basis the external environment information from the external environment sensors 18 (for example, image information from the cameras 26). However, the stop line position acquisition unit 52 may acquire the positional information of the stop line 106 on the basis of the map information 32.

The traffic participant recognition unit 54 recognizes the traffic participant 114 around the crossing area 108 on the basis of the external environment information from the external environment sensors 18 (for example, image information from the cameras 26).

The vehicle stop determination unit 56 determines whether to stop the host vehicle 100 that is traveling on the basis of the external environment information from the external environment sensors 18. In addition, if the vehicle stop determination unit 56 determines to stop the host vehicle 100, the vehicle stop determination unit 56 outputs a stop request signal to the automated driving control unit 60.

The vehicle travel start determination unit 58 determines whether to start the stopping host vehicle 100 traveling on the basis of the external environment information from the external environment sensors 18. In addition, if the vehicle travel start determination unit 58 determines to start the host vehicle 100 traveling, the vehicle travel start determination unit 58 outputs a travel start request signal to the automated driving control unit 60.

If the automated driving control unit 60 has received the stop request signal, the automated driving control unit 60 performs stop control of the host vehicle 100 by controlling the driving force device 36, the steering device 38, and the braking device 40. In addition, if the automated driving control unit 60 has received the travel start request signal, the automated driving control unit 60 performs travel start control of the host vehicle 100 by controlling the driving force device 36, the steering device 38, and the braking device 40.

The vehicle control device 10 according to the present embodiment is basically configured as above. Next, the stop control (vehicle control method) of the host vehicle 100 by the vehicle control device 10 is described mainly with reference to a flowchart in FIG. 2.

Figure 3:
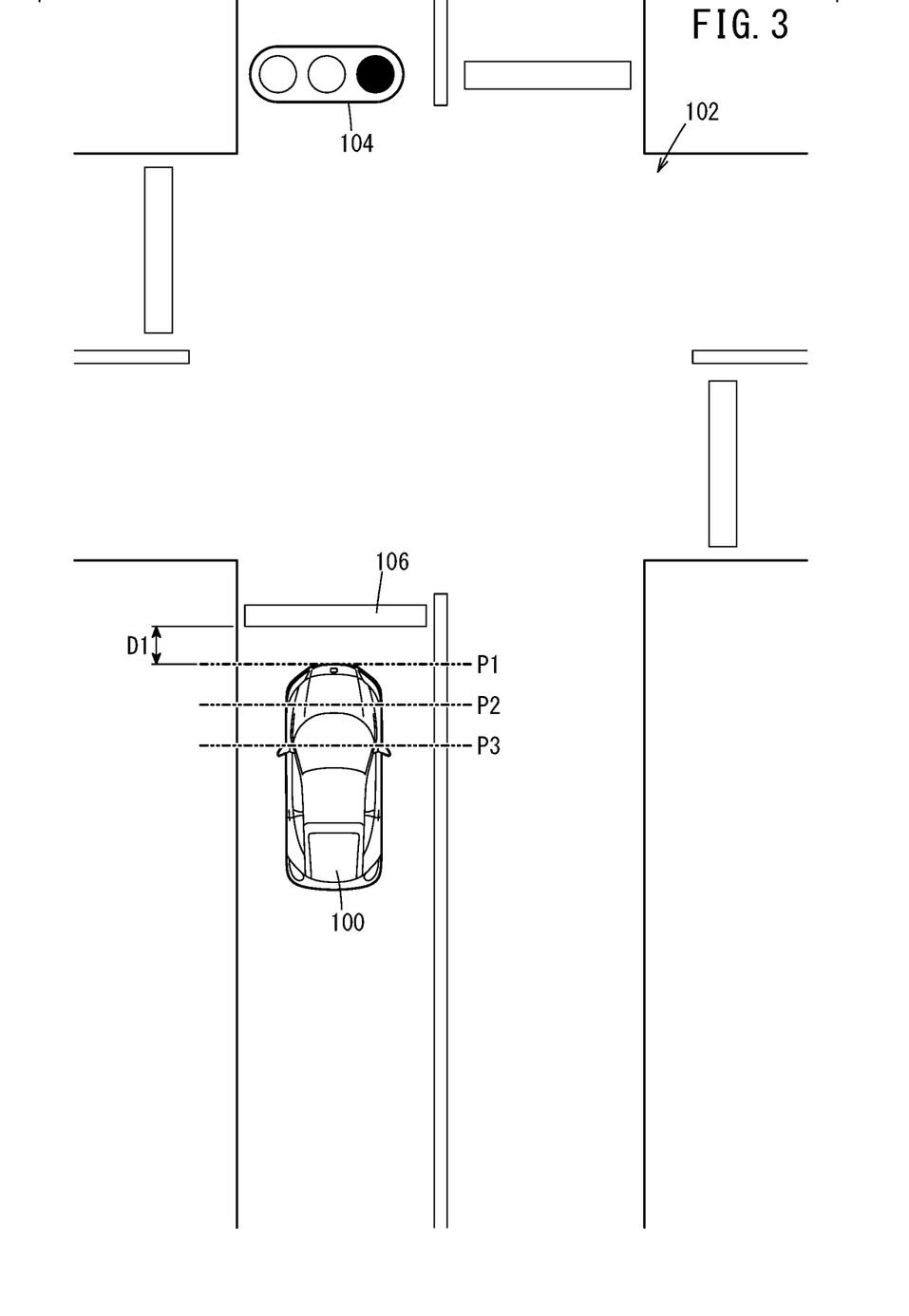
FIG. 3 is an explanatory diagram that schematically illustrates a state where a host vehicle stops at a reference target stop position.

Here, as illustrated in FIG. 3 to FIG. 5, description is made of a case where the host vehicle 100 corresponding to a leading vehicle stops on the basis of the positional information of the stop line 106 in an intersection 102 by a stop instruction of a traffic signal 104 (traffic sign) that is disposed in the intersection 102.

Figure 2:
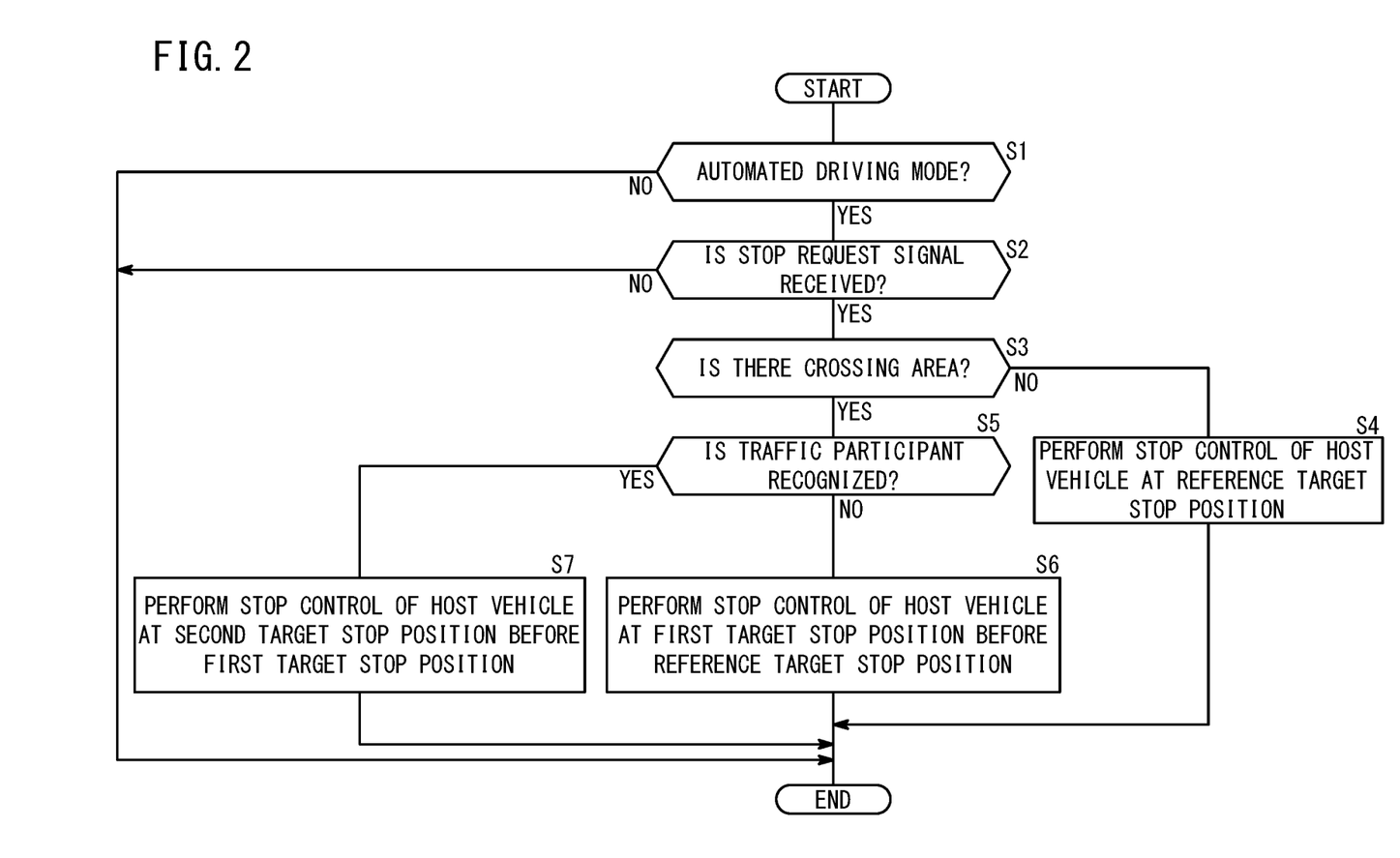
FIG. 2 is a flowchart that shows one example of stop control of the vehicle control device.

First, in step S1, the automated driving control unit 60 determines whether the driving mode is the automated driving mode that automatically performs the stop control of the host vehicle 100. If the automated driving control unit 60 determines that the driving mode is not the automated driving mode (mode is manual driving mode) (step S1: NO), this stop control is terminated.

If the automated driving control unit 60 determines that the driving mode is the automated driving mode (step S1: YES), it is determined whether the automated driving control unit 60 has received the stop request signal from the vehicle stop determination unit 56 in step S2. If the automated driving control unit 60 has not received the stop request signal (step S2: NO), this stop control is terminated.

If the automated driving control unit 60 has received the stop request signal (step S2: YES), the crossing area determination unit 50 determines whether the crossing area 108 exists in the travel direction of the host vehicle 100 on the basis of the image information from the cameras 26 or the map information 32 in step S3 (crossing area determination step).

If the crossing area determination unit 50 determines that the crossing area 108 does not exist (step S3: NO), as illustrated in FIG. 3, the automated driving control unit 60 performs the stop control of the host vehicle 100 at the reference target stop position P1 corresponding to the stop line 106 on the basis of the positional information of the stop line 106 that is acquired by the stop line position acquisition unit 52 in step S4 (stop control step). That is to say, the host vehicle 100 stops at a position that is separated from the stop line 106 toward the host vehicle 100 by D1. At this state, the stop control of the host vehicle 100 by the vehicle control device 10 ends.

On the other hand, if the crossing area determination unit 50 determines that the crossing area 108 exists (step S3: YES), the traffic participant recognition unit 54 recognizes the traffic participant 114 in the crossing area 108 and around the crossing area 108 on the basis of the external environment information from the external environment sensors 18 in step S5 (traffic participant recognition step).

If the traffic participant recognition unit 54 does not recognize the traffic participant 114 (step S5: NO), as illustrated in FIG. 4, the automated driving control unit 60 stops the host vehicle 100 at the first target stop position P2 before the reference target stop position P1 on the basis of the positional information of the stop line 106 that is acquired by the stop line position acquisition unit 52 in step S6 (stop control step). That is to say, the host vehicle 100 stops at a position that is separated from the stop line 106 toward the host vehicle 100 by D2.

In this way, a space between the crossing area 108 and the host vehicle 100 can be kept wide appropriately. Thus, a driver feels less uncomfortable, and the traffic participant 114 who comes near the crossing area 108 after the host vehicle 100 stops can also feel safe.

If the traffic participant recognition unit 54 recognizes the traffic participant 114 (step S5: YES), as illustrated in FIG. 5, the automated driving control unit 60 stops the host vehicle 100 at the second target stop position P3 before the first target stop position P2 on the basis of the positional information of the stop line 106 that is acquired by the stop line position acquisition unit 52 in step S7 (stop control step). That is to say, the host vehicle 100 stops at a position that is separated from the stop line 106 toward the host vehicle 100 by D3. Thus, the traffic participant 114 can feel safer.

Moreover, in step S7, the automated driving control unit 60 performs the stop control of the host vehicle 100 so that as more traffic participants 114 are recognized in step S5, the distance (D3) from the stop line 106 to the second target stop position P3 is longer. In other words, the automated driving control unit 60 corrects the second target stop position P3 stored in the storage device 42 so that as the number of the traffic participants 114 is larger, the distance from the stop line 106 to the second target stop position P3 is longer. Then, the automated driving control unit 60 stops the host vehicle 100 at the second target stop position P3 that is corrected. Thus, the traffic participant 114 who goes out of the crossing area 108 on the host vehicle 100 side, can also feel safe.

Subsequently, the travel start control (vehicle control method) of the host vehicle 100 by the vehicle control device 10 is described mainly with reference to a flowchart in FIG. 6. Here, a case where the host vehicle 100 in a stop state by the above stop control starts to travel is described.

First, in step S10, the automated driving control unit 60 determines whether the driving mode is the automated driving mode that automatically performs the travel start control of the host vehicle 100. If the automated driving control unit 60 determines that the driving mode is not the automated driving mode (mode is manual driving mode) (step S10: NO), this travel start control of the host vehicle 100 by the vehicle control device 10 is terminated.

If the automated driving control unit 60 determines that the driving mode is the automated driving mode (step S10: YES), it is determined whether the automated driving control unit 60 has received the travel start request signal from the vehicle travel start determination unit 58 in step S11. If the automated driving control unit 60 has not received the travel start request signal (step S11: NO), this travel start control of the host vehicle 100 by the vehicle control device 10 is terminated.

If the automated driving control unit 60 has received the travel start request signal (step S11: YES), the crossing area determination unit 50 determines whether the crossing area 108 exists on the basis of the image information from the cameras 26 or the map information 32 in step S12 (crossing area determination step).

Figure 6:
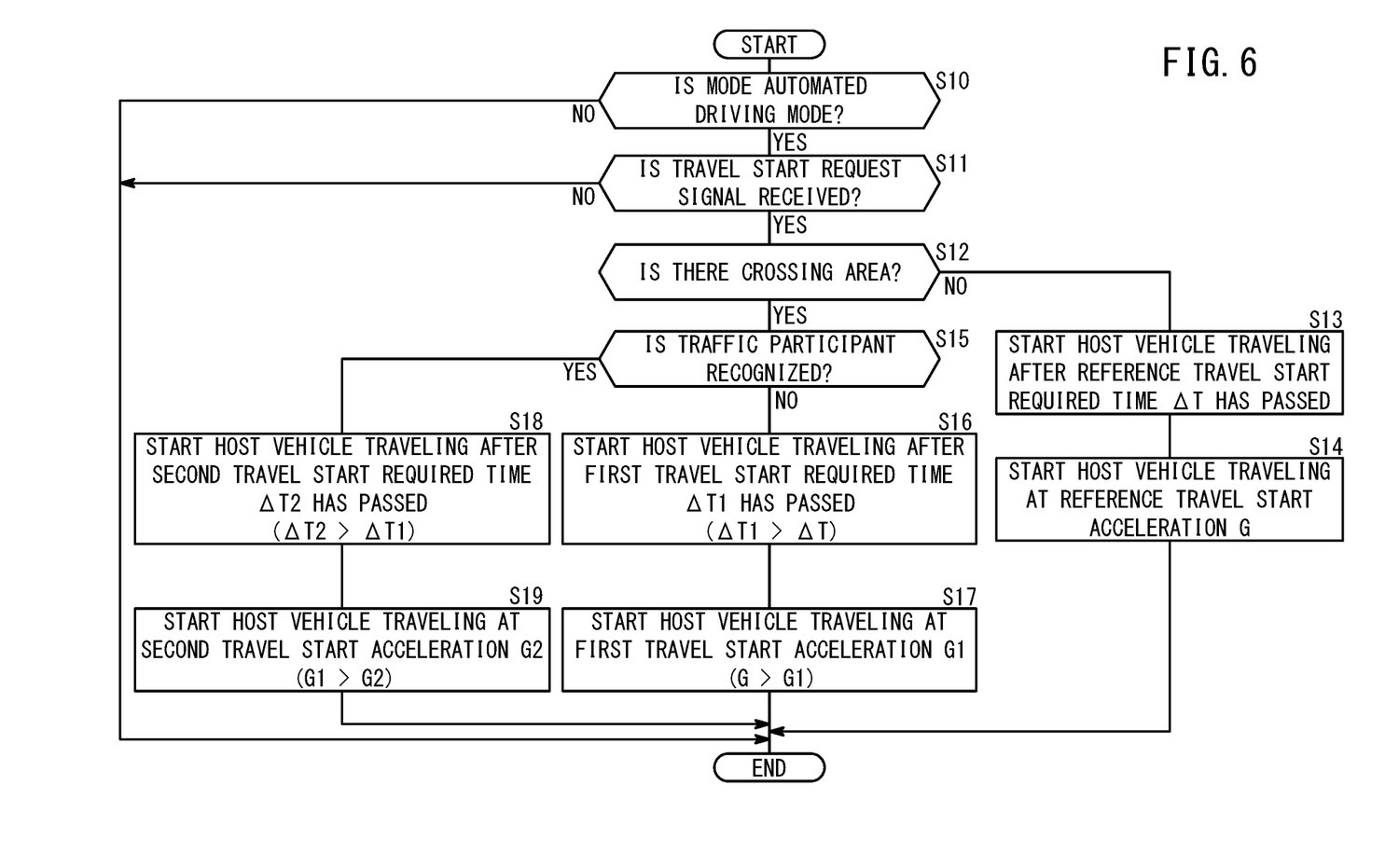
FIG. 6 is a flowchart that shows one example of travel start control of the vehicle control device.
Figure 7:
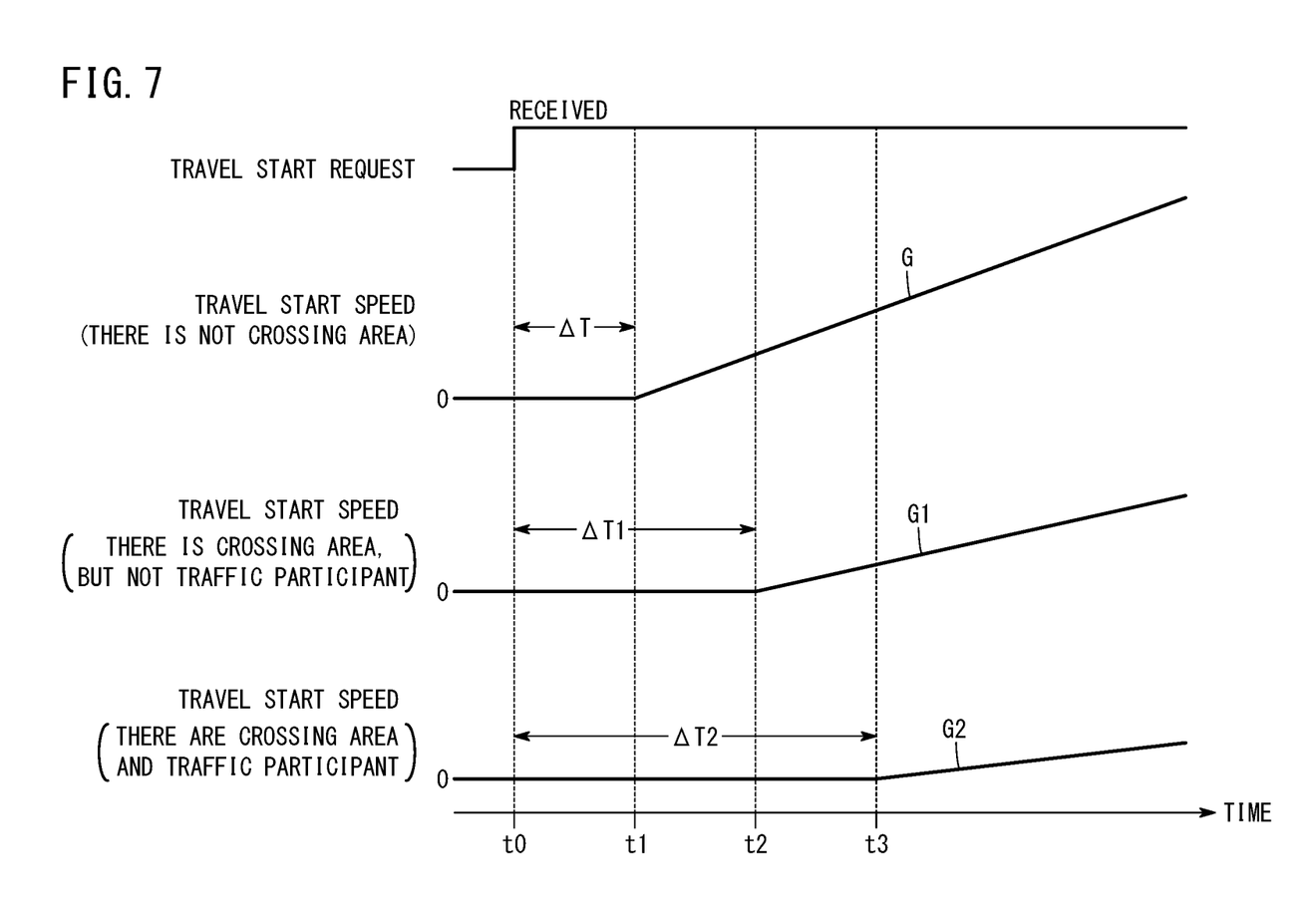
FIG. 7 is a graph for describing a travel start timing and travel start acceleration of the host vehicle.

As shown in FIG. 6 and FIG. 7, if the crossing area determination unit 50 determines that the crossing area 108 does not exist (step S12: NO), in step S13 (travel start time control step), the automated driving control unit 60 starts the host vehicle 100 traveling (at time t1) the reference travel start required time ΔT after the automated driving control unit 60 has received the travel start request signal (at time t0). Then, in step S14 (travel start acceleration control step), the automated driving control unit 60 starts the host vehicle 100 traveling at the reference travel start acceleration G.

If the crossing area determination unit 50 determines that the crossing area 108 exists (step S12: YES), the traffic participant recognition unit 54 recognizes the traffic participant 114 around the crossing area 108 in step S15. If the traffic participant recognition unit 54 does not recognize the traffic participant 114 (step S15: NO), in step S16 (travel start time control step), the automated driving control unit 60 starts the host vehicle 100 traveling (at time t2) the first travel start required time ΔT1 that is longer than the reference travel start required time ΔT after the automated driving control unit 60 has received the travel start request signal (at time t0). Thus, in a case where there is a possibility that the traffic participant 114 who has come near the crossing area 108 after the traffic signal 104 permits the host vehicle 100 to travel enters the crossing area 108, a timing for starting the host vehicle 100 traveling can be delayed.

Moreover, in step S17 (travel start acceleration control step), the automated driving control unit 60 starts the host vehicle 100 traveling at the first travel start acceleration G1 that is smaller than the reference travel start acceleration G. Thus, the traffic participant 114 who has come near the crossing area 108 after the traffic signal 104 permits the host vehicle 100 to travel can feel safe.

If the traffic participant recognition unit 54 recognizes the traffic participant 114 (step S15: YES), in step S18 (travel start time control step), the automated driving control unit 60 starts the host vehicle 100 traveling (at time t3) the second travel start required time ΔT2 that is longer than the first travel start required time ΔT1 after the automated driving control unit 60 has received the travel start request signal (at time t0). Thus, in a case where there is a possibility that the traffic participant 114 who is around the crossing area 108 after the traffic signal 104 permits the host vehicle 100 to travel enters the crossing area 108, the timing for starting the host vehicle 100 traveling can be delayed.

Moreover, in step S18, the automated driving control unit 60 starts the host vehicle 100 traveling so that as more traffic participants 114 are recognized in step S15, the second travel start required time ΔT2 is longer. In other words, the automated driving control unit 60 corrects the second travel start required time ΔT2 stored in the storage device 42 so that as the number of the traffic participants 114 is larger, the second travel start required time ΔT2 is longer. Then, the automated driving control unit 60 starts the host vehicle 100 traveling the corrected second travel start required time ΔT2 after the automated driving control unit 60 has received the travel start request signal. Thus, as the traffic participant 114 who is around the crossing area 108 after the traffic signal 104 permits the host vehicle 100 to travel is more likely to enter the crossing area 108, the timing for starting the host vehicle 100 traveling can be delayed more.

Subsequently, in step S19 (travel start acceleration control step), the automated driving control unit 60 starts the host vehicle 100 traveling at the second travel start acceleration G2 that is smaller than the first travel start acceleration G1. Thus, the traffic participant 114 who is around the crossing area 108 can feel safe.

Moreover, in step S19, the automated driving control unit 60 starts the host vehicle 100 traveling so that as more traffic participants 114 are recognized in step S15, the second travel start acceleration G2 is smaller. In other words, the automated driving control unit 60 corrects the second travel start acceleration G2 stored in the storage device 42 so that as the number of the traffic participants 114 is larger, the second travel start acceleration G2 is smaller. Then, the automated driving control unit 60 starts the host vehicle 100 traveling at the second travel start acceleration G2 that is corrected. Thus, the traffic participant 114 who is around the crossing area 108 can feel safer.

In the present embodiment, if the crossing area 108 exists in the travel direction of the host vehicle 100, the host vehicle 100 stops before the reference target stop position P1. Thus, the space between the crossing area 108 and the host vehicle 100 can be kept wide relatively. Therefore, the traffic participant 114 who is passing the crossing area 108 can feel safe. Moreover, the time after the host vehicle 100 starts to travel automatically and before the host vehicle 100 reaches the crossing area 108 can be made relatively long. Thus, the time to prepare for the unexpected event (for example, the traffic participant 114 enters the crossing area 108 when the host vehicle 100 automatically starts to travel) can be extended. Therefore, the vehicle occupant can feel safer.

In addition, if the traffic participant 114 is not recognized, the host vehicle 100 stops at the first target stop position P2 that is relatively close to the stop line 106. Thus, the driver feels less uncomfortable, and the traffic participant 114 who has come to the crossing area 108 after the host vehicle 100 stops can also feel safe.

Moreover, if the traffic participant 114 is recognized, the host vehicle 100 stops at the second target stop position P3 that is relatively far from the stop line 106. Thus, the traffic participant 114 can feel safer.

Incidentally, as the number of the traffic participants 114 is larger, the traffic participant 114 tends to go out of the crossing area 108. However, as the number of the traffic participants 114 is larger, the separation distance from the stop line 106 to the second target stop position P3 is longer. Thus, the traffic participant 114 who goes out of the crossing area 108 can also feel safe.

In the present embodiment, the automated driving control unit 60 makes the travel start required time longer in the case where the crossing area 108 exists, than in the case where the crossing area 108 does not exist. Thus, in the case where there is a possibility that the traffic participant 114 who has come near the crossing area 108 after the host vehicle 100 is permitted to travel enters the crossing area 108, the timing for starting the host vehicle 100 traveling can be delayed. Therefore, the time to prepare for the unexpected event can be extended.

Moreover, the automated driving control unit 60 makes the travel start required time longer in the case where the traffic participant 114 is recognized around the crossing area 108 than in the case where the traffic participant 114 is not recognized around the crossing area 108. Thus, in the case where there is a possibility that the traffic participant 114 who is around the crossing area 108 after the host vehicle 100 is permitted to travel enters the crossing area 108, the timing for starting the host vehicle 100 traveling can be delayed. Therefore, the time to prepare for the unexpected event can be extended.

Furthermore, as the number of the traffic participants 114 is larger, the automated driving control unit 60 makes the travel start required time longer. Thus, as the traffic participant 114 who is around the crossing area 108 after the host vehicle 100 is permitted to travel is more likely to enter the crossing area 108, the timing for starting the host vehicle 100 traveling can be delayed more. Therefore, the time to prepare for the unexpected event can be extended more.

In the present embodiment, the automated driving control unit 60 makes the travel start acceleration smaller in the case where the crossing area 108 exists, than in the case where the crossing area 108 does not exist. Thus, even if the traffic participant 114 has come near the crossing area 108 after the host vehicle 100 is permitted to travel, the traffic participant 114 can feel safe and the time to prepare for the unexpected event can be extended more.

Moreover, the automated driving control unit 60 makes the travel start acceleration smaller in the case where the traffic participant 114 is recognized around the crossing area 108 than in the case where the traffic participant 114 is not recognized around the crossing area 108. Thus, in the case where the traffic participant 114 exists around the crossing area 108 in the travel start of the host vehicle 100, the traffic participant 114 can feel safe and the time to prepare for the unexpected event can be extended more.

Furthermore, as the number of the traffic participants 114 is larger, the automated driving control unit 60 makes the travel start acceleration smaller. Thus, this configuration effectively enables the traffic participant 114 around the crossing area 108 to feel safe in the travel start of the host vehicle 100, and as the number of the traffic participants 114 is larger, the time to prepare for the unexpected event can be extended.

The present embodiment is not limited to the aforementioned configuration and control. For example, the stop control of the host vehicle 100 by the vehicle control device 10 can also be used in a case where the host vehicle 100 is stopped on the basis of the positional information of the stop line 106 by a temporary stop sign. In addition, the intersection 102 does not need to exist.

Moreover, in the travel start control of the host vehicle 100, the control regarding the travel start acceleration (step S14, step S17, and step S19 in FIG. 6) may be performed without performing the control regarding the travel start required time (step S13, step S16, step S18 in FIG. 6). Furthermore, in the travel start control of the host vehicle 100, the control regarding the travel start required time (step S13, step S16, step S18 in FIG. 6) may be performed without performing the control regarding the travel start acceleration (step S14, step S17, and step S19 in FIG. 6).

The preferred embodiment according to the present invention is described above. The present invention is not limited to the embodiment above, and can be changed freely within the range not departing from the concept of the present invention.

The invention claimed is:

1. A vehicle control device comprising:
an automated driving control unit configured to automatically perform stop control of a host vehicle;
a crossing area determination unit configured to determine whether a crossing area where a traffic participant would cross exists in a travel direction of the host vehicle; and
a stop line position acquisition unit configured to acquire positional information of a stop line, wherein:
if the crossing area determination unit determines that the crossing area does not exist, the automated driving control unit is configured to perform the stop control of the host vehicle so that the host vehicle stops at a reference target stop position corresponding to the stop line on a basis of the positional information of the stop line; and
if the crossing area determination unit determines that the crossing area exists, the automated driving control unit is configured to perform the stop control of the host vehicle so that the host vehicle stops before the reference target stop position on a basis of the positional information of the stop line.

2. The vehicle control device according to claim 1, further comprising a traffic participant recognition unit configured to recognize the traffic participant adjacent to the crossing area wherein:
if the traffic participant recognition unit does not recognize the traffic participant while the host vehicle travels, the automated driving control unit is configured to perform the stop control of the host vehicle so that the host vehicle stops at a first target stop position that is before the reference target stop position; and
if the traffic participant recognition unit recognizes the traffic participant while the host vehicle travels, the automated driving control unit is configured to perform the stop control of the host vehicle so that the host vehicle stops at a second target stop position that is before the first target stop position.

3. The vehicle control device according to claim 2, wherein the automated driving control unit is configured to correct the second target stop position so that as the traffic participant recognition unit recognizes more traffic participants, a separation distance from the stop line to the second target stop position becomes longer.

4. The vehicle control device according to claim 2, wherein if the automated driving control unit has received a travel start request signal of the host vehicle after the stop control of the host vehicle ends, the automated driving control unit is configured to automatically perform travel start control of the host vehicle.

5. The vehicle control device according to claim 4, wherein if the automated driving control unit has received the travel start request signal, the automated driving control unit is configured to perform the travel start control of the host vehicle so that a travel start required time from when the automated driving control unit has received the travel start request signal to when the host vehicle starts to travel becomes longer in a case where the crossing area determination unit determines that the crossing area exists, than in a case where the crossing area determination unit determines that the crossing area does not exist.

6. The vehicle control device according to claim 5, wherein the automated driving control unit is configured to perform the travel start control of the host vehicle so that the travel start required time becomes longer in a case where the traffic participant recognition unit recognizes the traffic participant adjacent to the crossing area, than in a case where the traffic participant recognition unit does not recognize the traffic participant adjacent to the crossing area.

7. The vehicle control device according to claim 6, wherein the automated driving control unit is configured to correct the travel start required time so that as the traffic participant recognition unit recognizes more traffic participants, the travel start required time becomes longer.

8. The vehicle control device according to claim 4, wherein if the automated driving control unit has received the travel start request signal, the automated driving control unit is configured to perform the travel start control of the host vehicle so that travel start acceleration of the host vehicle at a travel start is smaller in the case where the crossing area determination unit determines that the crossing area exists, than in the case where the crossing area determination unit determines that the crossing area does not exist.

9. The vehicle control device according to claim 8, wherein the automated driving control unit is configured to perform the travel start control of the host vehicle so that the travel start acceleration is smaller in a case where the traffic participant recognition unit recognizes the traffic participant adjacent to the crossing area, than in a case where the traffic participant recognition unit does not recognize the traffic participant adjacent to the crossing area.

10. The vehicle control device according to claim 9, wherein the automated driving control unit is configured to correct the travel start acceleration so that as the traffic participant recognition unit recognizes more traffic participants, the travel start acceleration is smaller.

11. A vehicle control method comprising:
a crossing area determination step of determining whether a crossing area where a traffic participant would cross exists in a travel direction of a host vehicle; and
a stop control step of automatically performing stop control of the host vehicle,
wherein in the stop control step, if it is determined that the crossing area does not exist in the crossing area determination step, the stop control of the host vehicle is performed so that the host vehicle stops at a reference target stop position corresponding to a stop line on a basis of positional information of the stop line, and
if it is determined that the crossing area exists in the crossing area determination step, the stop control of the host vehicle is performed so that the host vehicle stops before the reference target stop position on a basis of the positional information of the stop line.

12. The vehicle control method according to claim 11, further comprising a traffic participant recognition step of recognizing the traffic participant adjacent to the crossing area,
wherein in the stop control step, if the traffic participant is not recognized in the traffic participant recognition step while the host vehicle travels, the stop control of the host vehicle is performed so that the host vehicle stops at a first target stop position before the reference target stop position, and
if the traffic participant is recognized in the traffic participant recognition step while the host vehicle travels, the stop control of the host vehicle is performed so that the host vehicle stops at a second target stop position before the first target stop position.

13. The vehicle control method according to claim 12, wherein in the stop control step, the second target stop position is corrected so that as more traffic participants are recognized in the traffic participant recognition step, a separation distance from the stop line to the second target stop position becomes longer.

* * * * *